Figure 1:
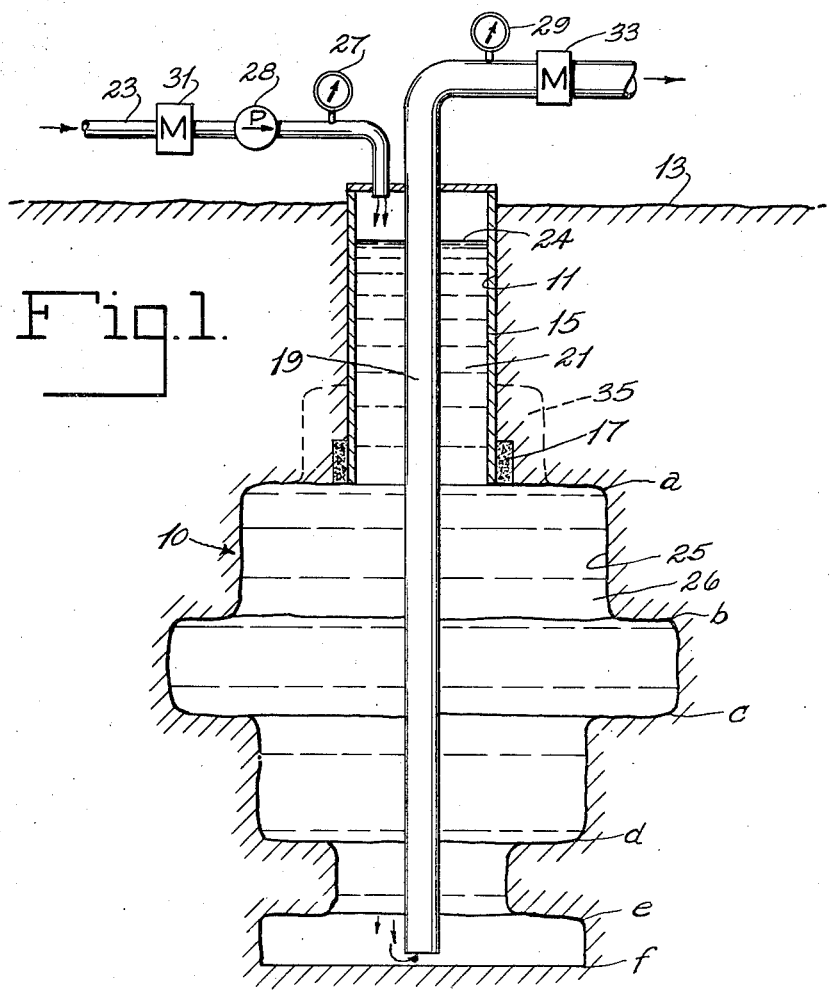

May 21, 1957  R. W. JOHNSTON, JR., ET AL  2,792,708
TESTING UNDERGROUND STORAGE CAVITIES
Filed Nov. 22, 1952

INVENTOR
ROWLAND W. JOHNSTON, JR.
AUSTEN M. SHOOK
BY
ATTORNEY

United States Patent Office 2,792,708
Patented May 21, 1957

2,792,708
TESTING UNDERGROUND STORAGE CAVITIES

Rowland W. Johnston, Jr., Bellaire, and Austen M. Shook, Houston, Tex., assignors to The Texas Company, New York, N. Y., a corporation of Delaware Application November 22, 1952, Serial No. 322,078

9 Claims. (Cl. 73—149)

Our invention relates to a novel method for forming an underground storage cavity for such fluids as liquefied petroleum gases, and to the surveying of such a cavity before or after its completion.

Liquefied petroleum gases such as butane or propane are sometimes stored in a huge underground cavity comprising a chamber located hundreds of feet below the ground in a salt formation and connected to the surface by a long approximately vertical access bore containing a casing which is sealed adjacent the lower end to the adjoining earth a cement seal. Up to the present time cavities have been formed by drilling down to a salt formation, such as the salt domes prevalent in the Texas oil fields, and circulating water through the salt. While cavities have been formed successfully, it has heretofor been impossible to determine their approximate shape and dimensions. Also, no procedure has existed for determining whether or not the cavity is proof against the leakage of gas past the casing from a stored liquefied petroleum gas pool. When storage cavities are formed in other underground formations such as clay or limestone, similar problems will be faced.

In accordance with the present invention there is provided a novel method for forming an underground storage cavity by drilling down to an underground formation, and creating a large chamber by circulating a wash liquid in contact with the material to be removed, e. g., by circulating water through a salt bed. The cavity is surveyed by stopping the circulation of water and then displacing the remaining brine from the cavity with a gas or other fluid which is lighter than and immiscible with the brine, determining the values of volume and pressure changes progressively during displacement of the brine as an index of cavity diameter, and calculating the cavity's shape and dimensions from the values so determined.

During the displacement of brine the soundness of the seal at the top of the chamber is determined by carefully observing the changes in the pressure of the light displacing fluid as brine is progressively displaced down through the access bore and the top portion of the chamber. If the pressure increases progressively the seal is satisfactory, but if the pressure remains constant immediately after the brine reaches the bottom of the access bore, then the casing seal has been weakened or lost.

Figure 2:
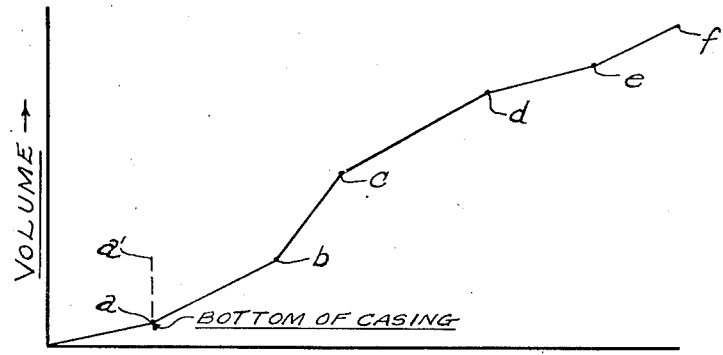

In the drawings:

Fig. 1 is a schematic vertical mid-sectional view taken through a storage cavity formed in accordance with the principles of the invention; and Fig. 2 is a graph wherein the volume of liquid displaced from a cavity is plotted against the displacing pressure and the depth of the fluid-liquid interface.

The principles of the invention will be described in detail hereinafter, by way of illustration only, as applied to the formation of a cavity in a salt bed by circulating water therethrough, and subsequently surveying the cavity for dimensions and shape, and for soundness of seal. It is to be understood, however, that the same principles apply to the formation of cavities in other materials which may be removable by other liquids, for example, clay which is removable by a deflocculating solution, or limestone which is removable by an acid solution.

In forming an underground storage cavity 10 in accordance with the invention a deep bore 11 is first drilled from the ground 13 down into an underground formation of salt which can be removed by the circulation of water in contact therewith. A casing 15 is set in the bore 11 and is cemented at 17 to the surrounding formation adjacent the bottom of the casing to form a fluid-tight seal against the leakage of gas past the casing.

A pipe 19 is inserted through the casing 15 in spaced relation thereto and the circulation of water through the salt is then begun by pumping water down through the pipe 19 into contact with the salt, and removing brine through the annulus 21 and the discharge pipe 23. If desired, this flow may be reversed, in which case the fresh water flows down through the annulus 21 and the brine passes up through the pipe 19. Pipe 19 can be raised or lowered as required to produce a chamber of the desired dimensions. The circulating water dissolves large quantities of salt and creates a chamber 25 having a more or less uneven shape depending upon the nature of the salt formation, which may be more soluble in some strata than others.

The bore 11 may extend hundreds of feet below the surface of the earth, and the chamber 25 also may be hundreds of feet long with a widely varying diameter which may be as small as 15 feet in some places and as large as 60 feet in other places.

Upon completion of the cavity 10, as described above, it contains a pool 26 of brine up to about the surface of the ground, more or less, in both annulus 21 and pipe 19.

The cavity is then surveyed by introducing into the annulus 21 on the top surface 24 of the column of brine a fluid of known density which is immiscible with and lighter than the brine. Light liquids such as kerosene or liquefied petroleum gas can be employed, but for economy it is preferred to use a gas such as natural gas or air. The pressure on the top of the brine column is increased progressively by pumping in more fluid with a pump 28 to expel brine from the cavity through the pipe 19, while progressively determining the pressure differential between the displacing fluid at the pressure gauge 27 and the brine at the pressure gauge 29. Concurrently the corresponding volume of the part of the cavity from which brine has been displaced is determined by reading either or both of the meters 31 for displacing fluid and 33 for brine.

Having determined the pressure differential between the displacing fluid and the brine, the location of the interface 24 between them can be calculated by the following equation:

$$I = \frac{144(Pf - Pb)}{Db - Df}$$

wherein:

$I$ = the depth of the interface below the highest point of pipe 19, in feet
$Pf$ = pressure of the displacing fluid in pounds per square inch
$Pb$ = pressure of the liquid brine in pounds per square inch
$Db$ = density of liquid brine in pounds per cubic foot
$Df$ = density of displacing fluid in pounds per cubic foot When the brine is discharged at atmospheric pressure it is only necessary to read pressure gauge 27 since gauge 29 will show zero pressure for $Pb$. Also, when the displacing fluid is a gas such as air or natural gas, its density $D_f$ can be disregarded ordinarily.

The approximate diameter of the cavity can be calculated between any two depths where the pressure of the displacing fluid shows approximately a straight line increase, by correlating the volume of liquid brine displaced from the cavity between such depths, as determined by meter 33, with the distance between such depths. The diameter is determined by the following equation:

$$d = \frac{4(V_2 - V_1)}{(I_2 - I_1)}$$

wherein:

$d$ = diameter of cavity in feet
$V_2$ = volume of liquid brine displaced at a low interface depth $I_2$, such as point $c$ of Fig. 1, in cubic feet
$V_1$ = volume of brine displaced at a high interface depth $I_1$, such as point $b$ of Fig. 1, in cubic feet
$I_2$ = depth of interface at a low point, such as $c$ of Fig. 1
$I_1$ = depth of interface at a high point, such as $b$ of Fig. 1, in feet I is to be understood that only approximate diameter determinations can be made in this way because the nature of the salt washing method is such that the cavity 25 does not necessarily have truly cylindrical walls between any two points along its length. However, the approximate determination is a useful partial solution to the problem.

Before charging a storage cavity 25 with liquefied petroleum gas it is essential to determine whether or not the cavity is proof against leakage. When washing out a cavity with a liquid there may be a tendency for the liquid to act on the roof of the cavity in the vicinity of the cement seal 17 to weaken the seal or completely destroy it as by washing out a passage 35 around the seal through which gas can leak. The soundness of the seal 17 can be determined by carefully observing on gauge 27 the pressure of the displacing fluid as brine is discharged from the cavity and the fluid-liquid interface 24 is lowered. As the interface falls within the casing 15 the pressure of the displacing fluid increases progressively in substantially a straight line as at OA in Fig. 2. If seal 17 is sound, when the interface 24 reaches the lower end of the casing 15 the pressure continues to increase where the cavity has broadened out, although at a slower rate relative to the volume of liquid displaced, as at $ab$ in Fig. 2. If seal 17 is unsound, however, the displacing fluid flows up into the passage 35 to displace brine therefrom, and meanwhile the pressure of the displacing fluid remains constant as at $aa'$ in Fig. 2. By carefully observing the pressure before and just after the interface 24 reaches the lower end of the casing it is thus possible to determine accurately whether or not the seal 17 is sound.

The graph of Fig. 2 also shows the correlation between the pressure and the shape of the cavity 10 at different points along its length. The letters on Fig. 2 refer to the points identified by similar letters in Fig. 1.

Obviously many modifications and variations of the invention, as hereinbefore set forth, may be made without departing from the spirit and scope thereof, and therefore only such limitations should be imposed as are indicated in the appended claims.

We claim:

1. In a method for surveying an underground storage cavity comprising a chamber of relatively large diameter and an access bore of relatively small diameter extending up from said chamber to the ground, the steps which comprise providing a pool of liquid of known density in said cavity; providing a conduit in said bore having an entrance in said chamber and an exit outside of said cavity; introducing on the top of said pool a fluid of known density which is lighter than and immiscible with said liquid; expelling liquid from said cavity through said conduit in said access bore by applying progressively increasing pressure to said fluid while increasing the volume thereof; progressively determining both the pressure difference between said introduced fluid and the liquid leaving said cavity, and the corresponding volume of the part of said cavity from which liquid has been displaced; and utilizing pressure difference variations and such corresponding volumes as an index of the diameter of said cavity.

2. In a method for surveying an underground storage cavity comprising a chamber of relatively large diameter and an access bore of relatively small diameter extending up from said chamber to the ground, the steps which comprise providing a pool of liquid of known density in said cavity; providing a conduit in said bore having an entrance in said chamber and an exit outside of said cavity; introducing on the top of said pool a fluid of known density which is lighter than and immiscible with said liquid; expelling liquid from said cavity through said conduit in said access bore and discharging said liquid at substantially atmospheric pressure by applying progressively increasing pressure to said fluid while increasing the volume thereof; progressively measuring both the pressure of said introduced fluid and the corresponding volume of the part of said cavity from which liquid has been displaced; and utilizing pressure variations and such corresponding volumes as an index of the diameter of said cavity.

3. In a method in accordance with claim 1, determining the volume of the part of said cavity from which liquid has been displaced by measuring the volume of the liquid expelled from said cavity.

4. In a method in accordance with claim 1, determining the volume of the part of said cavity from which liquid has been displaced by measuring the volume of the fluid introduced on the top of said pool.

5. In a method for forming an underground storage cavity by drilling a hole from the surface into a dissolvable underground formation, placing a casing in said hole, installing a seal between said casing and the surrounding earth adjacent the bottom of said casing, providing a conduit in said casing having an entrance below the bottom of said casing and an exit at the surface, circulating water through said hole within said casing to dissolve material and provide a pool of water in the resulting cavity and in said casing and conduit, and stopping the circulation of water upon the completion of said cavity while retaining said pool of water in said cavity, casing and conduit, the improvement which comprises thereafter determining the tightness of said seal by introducing to said casing on the top of said pool a gas which is lighter than and immiscible with said liquid; expelling liquid from said casing through said conduit by progressively increasing the quantity of said gas on the top of said pool while progressively increasing the pressure of said gas; and determining said gas pressure at points both before and just after the fluid-liquid interface reaches the bottom of said casing, a constant pressure between said points indicating that gas is leaking around the bottom of said casing and up past said seal, a continuing increase in pressure between said points indicating that said seal is sound.

6. Apparatus for surveying an underground storage cavity comprising a chamber of relatively large diameter deep within the earth and an access bore of relatively small diameter extending up from said chamber to the ground level, said apparatus comprising a pipe extending from the ground down through said access bore to a position in said chamber between the top and the bottom thereof; sealing means sealing the space between said pipe and the wall of said bore to prevent the escape of fluid therethrough; a fluid supply conduit connected to the space between said pipe and the wall of said bore for introducing thereto under pressure a fluid which is immiscible with and lighter than said liquid, for forcing liquid from said cavity up through said pipe; flow meter means in either said conduit or pipe above the ground for measuring the volume of liquid displaced from said cavity by flowing through said conduit; and means above the ground connected to said conduit for measuring the pressure of said fluid in said conduit.

7. Apparatus in accordance with claim 6 wherein said flowmeter means comprises flowmeters in both said pipe and said conduit.

8. Apparatus in accordance with claim 6, also comprising means above the ground connected to said pipe for measuring the pressure of said liquid leaving said cavity.

9. Apparatus in accordance with claim 6, wherein said sealing means comprises a casing lining said access bore, a cement seal between a bottom portion of said casing and the surrounding earth, and a closure for the top of said casing adjacent the ground level.

References Cited in the file of this patent

UNITED STATES PATENTS

| | | |
|---|---|---|
| 273,623 | Smith | Mar. 6, 1883 |
| 2,010,755 | Foley | Aug. 6, 1935 |
| 2,235,770 | McConnell | Mar. 18, 1941 |
| 2,344,771 | Halliburton | Mar. 21, 1944 |

FOREIGN PATENTS

| | | |
|---|---|---|
| 952,056 | France | Apr. 25, 1949 |